US011889345B2

(12) United States Patent
Nieto Aliques et al.

(10) Patent No.: US 11,889,345 B2
(45) Date of Patent: Jan. 30, 2024

(54) EVENT-BASED LOAD BALANCING IN 4G-5G MULTI-RADIO DUAL CONNECTIVITY

(71) Applicant: EXFO Solutions SAS, Saint-Jacques de la Lande (FR)

(72) Inventors: Marc Nieto Aliques, Valencia (ES); David García Roger, Moncada (ES); Daniel Calabuig Soler, Valencia (ES); Pau Usach Molina, Valencia (ES); María Victoria Bausá Aragonés, Alboraya (ES); Francisco Vicente Guillén Ruiz, Valencia (ES); Eduardo Palomero Lopez, Valencia (ES)

(73) Assignee: EXFO Solutions SAS, Saint-Jacques-de-la-Lande (FR)

( * ) Notice: Subject to any disclaimer, the term of this patent is extended or adjusted under 35 U.S.C. 154(b) by 205 days.

(21) Appl. No.: 17/319,484

(22) Filed: May 13, 2021

(65) Prior Publication Data

US 2021/0360468 A1   Nov. 18, 2021

Related U.S. Application Data

(60) Provisional application No. 63/069,820, filed on Aug. 25, 2020, provisional application No. 63/025,298, filed on May 15, 2020.

(51) Int. Cl.
*H04W 76/15* (2018.01)
*H04W 28/02* (2009.01)
(Continued)

(52) U.S. Cl.
CPC ... *H04W 28/0268* (2013.01); *H04W 28/0838* (2020.05); *H04W 28/0865* (2023.05); *H04W 28/0983* (2020.05); *H04W 76/15* (2018.02)

(58) Field of Classification Search
None
See application file for complete search history.

(56) References Cited

U.S. PATENT DOCUMENTS 9,992,711 B2   6/2018  Xu et al.
10,149,217 B2  12/2018 Kubota et al.
(Continued)

FOREIGN PATENT DOCUMENTS

CN   105827271 A  *  8/2016
CN   110461011 A  * 11/2019  ............ H04W 28/08
(Continued)

OTHER PUBLICATIONS

Intel Corporation: "RRM measurement and reporting in NR unlicensed", 3GPP Draft; R2-1809790—Mobility-NRU V00, 3rd Generation Partnership Project T3GPP, vol. RAN WG2, No. adhoc 1807, Montreal, Canada; Jul. 1, 2018, XP051467052, Retrieved from the Internet: URL:http://www.3gpp.org/ftp/Meetings%5F3GPP%5FSYNC/RAN2/Docs [retrieved on Jul. 1, 2017].

(Continued)

*Primary Examiner* — The Hy Nguyen
(74) *Attorney, Agent, or Firm* — Baratta Law PLLC; Lawrence A. Baratta, Jr.

(57) ABSTRACT

Systems and methods for balancing load in an area of a wireless network comprising first nodes operating according to a first Radio Access Technology and at least one second node operating according to a second Radio Access Technology. The method comprises establishing a connection between a user device and a first node; receiving an indication of an entry threshold for establishing a connection between the user device and a second node during a current time period, wherein the entry threshold is determined in dependence on an expected usage requirement for the area of the wireless network during the current time period; determining, by the user device, whether a parameter of a (Continued)

signal received from the second node exceeds the entry threshold; and responsive to determining that the parameter of the signal received from the second node exceeds the entry threshold, establishing, by the first node, a dual connectivity session between the user device and both the first and the second nodes.

20 Claims, 10 Drawing Sheets

(51) Int. Cl.
    *H04W 28/08*     (2023.01)
    *H04W 28/086*     (2023.01)

(56) References Cited

U.S. PATENT DOCUMENTS

| | | | |
|---|---|---|---|
| 10,278,098 B2 | 4/2019 | Xu et al. | |
| 10,299,278 B1* | 5/2019 | Jorgovanovic | H04W 48/18 |
| 10,367,677 B2 | 7/2019 | Parkvall et al. | |
| 10,420,161 B1 | 9/2019 | Sava et al. | |
| 10,536,917 B2 | 1/2020 | Chandramouli et al. | |
| 10,674,404 B2 | 6/2020 | Koudouridis et al. | |
| 10,716,157 B2 | 7/2020 | Belghoul et al. | |
| 10,716,158 B1 | 7/2020 | Pawar et al. | |
| 10,736,163 B2 | 8/2020 | Zeng et al. | |
| 2013/0021962 A1* | 1/2013 | Hu | H04W 28/0808 370/315 |
| 2015/0127848 A1* | 5/2015 | Houdaille | H04N 21/8456 709/233 |
| 2017/0034709 A1* | 2/2017 | Hapsari | H04W 24/10 |
| 2017/0041821 A1* | 2/2017 | Uchiyama | H04W 24/10 |
| 2017/0215076 A1* | 7/2017 | Youn | H04W 16/04 |
| 2019/0053115 A1 | 2/2019 | Ngai et al. | |
| 2019/0069205 A1 | 2/2019 | Lee et al. | |
| 2019/0200406 A1 | 6/2019 | Henttonen et al. | |
| 2019/0253920 A1 | 8/2019 | Zhang et al. | |
| 2019/0306763 A1 | 10/2019 | Humbert et al. | |
| 2019/0342800 A1 | 11/2019 | Sirotkin et al. | |
| 2019/0379469 A1 | 12/2019 | Lu et al. | |
| 2020/0045581 A1 | 2/2020 | Dong et al. | |
| 2020/0068482 A1 | 2/2020 | Lu et al. | |
| 2020/0077312 A1* | 3/2020 | Tsuboi | H04W 24/10 |
| 2020/0107235 A1* | 4/2020 | Peisa | H04B 7/0617 |
| 2020/0128494 A1 | 4/2020 | Lu et al. | |
| 2020/0267614 A1 | 8/2020 | Park et al. | |
| 2020/0351792 A1 | 11/2020 | Ghelichi et al. | |
| 2022/0078660 A1* | 3/2022 | Li | H04L 1/0002 |

FOREIGN PATENT DOCUMENTS

| | | | |
|---|---|---|---|
| CN | 111107579 A | * | 5/2020 |
| WO | 2020156498 A1 | | 8/2020 |
| WO | 2020242987 A1 | | 12/2020 |

OTHER PUBLICATIONS

Interdigital Inc: "Conditional PSCell addition/change", 3GPP Draft; R2-1912882, 3rd Generation Partnership Project (3GPP), vol. RAN WG2, No. 107bis, Chongqing, China; Oct. 4, 2019, XP051804696, Retrieved from the Internet: URL:https://ftp.3gpp.org/tsg ran/WG2 RL2/T SGR2 107bis/Docs/R2-1912882.zip R2-1912882 (R16-x WI AI 694 CHO PSCell).doc.doc [retrieved on Oct. 4, 2019].
Fujitsu: "Inter-RAT measurement for EN-DC", 3GPP Draft; R2-1710362, 3rd Generation Partnership Project (3GPP), vol. RAN WG2, No. 99bis, Prague, Czech Republic; Oct. 8, 2017, XP051342409, Retrieved from the Internet: URL:http://www.3gpp.org/ftp/ Meetings -3GPP - SYNC/RAN2/Docs/ [retrieved on Oct. 8, 2017].
Qualcomm Incorporated: "Conditional NR PSCell addition-change procedures", 3GPP Draft; R2-1912297, 3rd Generation Partnership Project (3GPP), vol. RAN WG2, No. 107bis, Chongqing, CN; Oct. 4, 2019, XP051804379, Retrieved from the Internet: URL:https:// ftp.3gpp.org/tsg_ran/WG2_RL2/TSGR2_107bis/Docs/R2-1912297. zip R2-1912297.docx [retrieved on Oct. 4, 2019].
Interdigital Inc: "LTE Measurement Reports for EN-DC", 3GPP Draft; R2-1710668, 3rd Generation Partnership Project (3GPP), vol. RAN WG2, No. 99bis Prague, Czech Republic; Oct. 8, 2017, XP051342698, Retrieved from the Internet: URL:http://www.3gpp. org/ftp/Meetings_3GPP_SYNC/RAN2/Docs/ [retrieved on Oct. 8, 2017].
Intel Corporation: "RRM measurement and reporting in NR unlicensed", 3GPP Draft; R2-1906278—Mobility-NRU V00, 3rd Generation Partnership Project T3GPP, vol. RAN WG2, No. 106 Reno, Nevada, USA; May 13, 2019, XP051729745, Retrieved from the Internet: URL:http://www.3gpp.org/ftp/Meetings%5F3GPP%5FSYNC/ RAN2/Docs/R2%2D1906278%2Ezip [retrieved on May 13, 2019].
Oct. 8, 2021, Extended European Search Report for European Application No. EP 21173917.2.
Hiwang et al., "QoS-Guaranteed Radio Resource Management in LTE-A Co-Channel Networks with Dual Connectivity," Applied Sciences, Article, Jul. 26, 2019, pp. 1-22.
Lei et al., "QoS_Aware User Association for Load Balancing in Heterogeneous Cellular Network with Dual Connectivity," IEEE, 2nd IEEE International Conference on Computer and Communications, 2016, pp. 1-6.
Monserrat et al., "Application of alternating projection method to ensure feasibility of shadowing cross-correlation models," Electronics Letters, vol. 43, No. 13, Jun. 21, 2007, pp. 1-2.
Martikainen et al., "Mobility and Reliability in LTE-5G Dual Connectivity Scenarios," IEEE, 2017, pp. 1-7.
Monteiro et al., "Distributed RRM for 5G Multi-RAT Multiconnectivity Networks," IEEE Systems Journal, vol. 13, No. 1, Mar. 2019, pp. 192-203.
Nguyen et al., "Minimum Latency and Optimal Traffic Partition in 5G Small Cell Networks," IEEE, 2018, pp. 1-5.
Yilmaz et al., "Overview of LTE-NR Dual Connectivity," IEEE Communications Magazine, Jun. 2019, pp. 138-144.
Antonioli et al., "Dual Connectivity for LTE-NR Cellular Networks: Challenges and Open Issues," Journal of Communication and Information Systems, vol. 33, No. 1, 2018, pp. 282-294.
3GPP TS 36.331 V15.6.0, 3rd Generation Partnership Project; Technical Specification Group Radio Access Network; Evolved Universal Terrestrial Radio Access (E-UTRA); Radio Resource Control (RRC); Protocol specification (Release 15), Jun. 2019, pp. 1-7.
3GPP TR 38.901 V16.0.0, 3rd Generation Partnership Project; Technical Specification Group Radio Access Network; Study on channel model for frequencies from 0.5 to 100 GHZ (Release 16), Oct. 2019, pp. 1-101.

\* cited by examiner

TABLE 1
AVERAGE NUMBER OF UES PER MeNB

| HUEs | MeNB "1" | MeNB "2" | MeNB "3" | MeNB "4" |
|---|---|---|---|---|
| 0 | 10 | 10 | 10 | 10 |
| 500 | 205.3125 | 68.59375 | 27.578125 | 10 |
| 1000 | 400.625 | 127.1875 | 45.15625 | 10 |

*FIG. 8*

TABLE II
TI FOR EACH MeNB

| HUEs | MeNB "1" | MeNB "2" | MeNB "3" | MeNB "4" |
|---|---|---|---|---|
| 0 | -63 dBW | -63 dBW | -63 dBW | -63 dBW |
| 500 | -53 dBW | -58 dBW | -60 dBW | -63 dBW |
| 1000 | -49 dBW | -54 dBW | -59 dBW | -63 dBW |

FIG. 9

TABLE III
AVERAGE THROUGHPUT AND MR-DC CONNECTIONS PER SECOND WITH THE OPTIMIZED TI VALUES.

| HUEs | Throughput [Mb/s] | MR-DC connections/s |
|---|---|---|
| 0 | 20.435 | $9.225 \times 10^{-3}$ |
| 500 | 4.793 | $9.192 \times 10^{-4}$ |
| 1000 | 2.597 | $4.675 \times 10^{-4}$ |

*FIG. 10*

EVENT-BASED LOAD BALANCING IN 4G-5G MULTI-RADIO DUAL CONNECTIVITY

CROSS-REFERENCE TO RELATED APPLICATION

The present disclosure claims priority to U.S. Provisional Patent Application No. 63/025,298, filed May 15, 2020, and entitled "EVENT-BASED LOAD BALANCING IN 4G-5G MULTI-RADIO DUAL CONNECTIVITY," and to U.S. Provisional Patent Application No. 63/069,820, filed Aug. 25, 2020, and entitled "EVENT-BASED LOAD BALANCING IN 4G-5G MULTI-RADIO DUAL CONNECTIVITY," the contents of which are incorporated by reference in their entirety.

FIELD OF THE DISCLOSURE

The present disclosure generally relates to wireless networks. More particularly, the present disclosure relates to systems and methods for event-based load balancing in a multi-radio dual connectivity (MR-DC) wireless network.

BACKGROUND OF THE DISCLOSURE

The arrival of fifth generation (5G) cellular network technology represents a significant step in the ongoing development of network communication technologies. In order to hasten the benefits of this technology, approaches have been developed to allow the fast deployment of 5G by means of utilising the mature 4G network which already provides extensive coverage. In particular, by deploying a 5G non-standalone (NSA) network, an operator can continue using the evolved packet core (EPC) of 4G. 5G NSA deployments rely on multi-radio dual connectivity (MR-DC), inherited from 4G dual connectivity, to connect two base stations of different technologies to the same core. In order to use MR-DC, the user equipment (UEs) must be configured with two different radios: one for 5G (i.e., new radio—NR) and one for 4G (i.e., evolved universal mobile telecommunications system—UMTS—terrestrial radio access—E-UTRA). Dual connectivity techniques in widespread use today require that base stations act as either a master node (MN) or a secondary node (SN). In current implementations of 5G NSA, the master nodes are always 4G evolved node Bs (eNBs), which are known as master eNBs (MeNB), and the 5G next generation node Bs (gNBs), which therefore act as secondary nodes, are known as secondary gNBs (SgNB). Both are interconnected with an X2 interface known in the art and the master node (at least) is connected to the core.

In many 5G deployments, operators are co-locating the gNBs with other eNBs since this approach facilitates and reduces the cost of initial deployments of this technology. In this case, MR-DC is able to deliver better coverage and increased capacity compared with long term evolution (LTE) or NR. Moreover, with these deployments operators are trying to maximise the locations in which UEs are connected to 5G. In other words, operators wish to ensure that their clients are connected to 5G for a maximal amount of time. This is achieved by allowing the UEs to connect to MR-DC as soon as the UEs can decode the 5G broadcast channel. In this manner, as the number of 5G clients increases, the 5G nodes will eventually saturate, resulting in a degradation of service.

SUMMARY

According to a first aspect of the present disclosure, there is provided a method for load balancing in a multi-radio dual connectivity (MR-DC) network. In particular, a method for balancing a load in an area of a wireless network including first nodes operating according to a first Radio Access Technology and at least one second node operating according to a second Radio Access Technology comprises establishing a connection between a user device and a first node. The method further comprises receiving, once the connection is established, at the user device and from the first node, an indication of an entry threshold for establishing a connection between the user device and a second node. This entry threshold is determined in dependence on an expected usage requirement in the area of the wireless network during a current time period. The method further comprises, determining whether a parameter of a signal received from the second node exceeds the entry threshold, and, responsive to determining that the parameter of the signal received from the second node exceeds the entry threshold, establishing, by the first node, a dual connectivity session between the user device and both the first and the second nodes. The parameter of the signal received from the second node can be a signal quality metric, such as the reference signal received power, the reference signal received quality or the reference signal strength indicator.

This method may enable control over the number of user equipments (UEs) that connect to the second node (e.g., a 5G node or SgNB) in such a way as to improve overall network efficiency. In some embodiments, the entry threshold may be determined in order to maximise the average data throughput for the expected network usage requirement. The expected network usage requirement may be the expected total requested bit rate for user devices during the time period within a geographical area associated with the first and second nodes. The expected network usage requirement may additionally or alternatively comprise the expected number of user devices within the geographical area during the time period. In some examples, the total requested bit rate may be calculated by multiplying the expected number of devices by an estimated average requested bit rate per device. In this manner, the entry threshold can be dynamically configured based on, for example, an expected number of user devices (e.g UEs) in the area of the MR-DC wireless network, enabling the network to adjust to a load of the wireless network and avoid saturation of SgNBs while efficiently serving the requests of the UEs in that area. The approach presented can be applied to live networks and provide further advantages while keeping signalling information under control. Determining the entry threshold may comprise comparing the expected network usage for user devices within the area which meet the entry threshold with a measure of bandwidth limit for the second node. For example, determining the entry threshold may comprise calculating the entry threshold such that a total expected bit rate for all user devices meeting the entry threshold does not exceed the bandwidth limit for the second nodes. Steps of determining the entry threshold may be carried out by one or more of the nodes (e.g. the first node) or by another element of the wireless network; for example, the wireless network may comprise one or more processors configured to determine the entry threshold and communicate it to the first node.

Optionally, the method can also comprise determining the entry threshold by simulating a relationship between average throughput per user device and the entry threshold and selecting the entry threshold, based on the relationship, in order to maximise the simulated average throughput per user device. Such a simulation may or may not be generated with reference to observed data in the network itself. For example, in the absence of sufficient network data, an area of the MR-DC wireless network can be simulated from theoretical principles. The results yielded by the simulation can be used to generate a relationship between the simulated average throughput per user device and the entry threshold. An entry threshold for a real-life node can be determined based on the relationship obtained via the simulation.

Optionally, determining the entry threshold can include calculating a preferred entry threshold for a low load time period, calculating a preferred entry threshold for a high load time period and interpolating between the preferred entry thresholds for the low load and high load time periods in order to calculate the entry threshold for the current time period. The preferred entry thresholds may be calculated based on observed data, such as network traffic data, during the high and low load time periods. Calculating the preferred entry threshold for all possible loads can require processing large amounts of network traffic data recorded over long periods of time. Accurately analysing this data may be time and resource consuming. A more efficient way of calculating optimal entry threshold may be achieved by calculating a preferred threshold for a low load time period and a different preferred threshold for a high load time period and allowing to interpolate a preferred entry threshold value for a current time period (and associated network load/anticipated number of client devices) from the relationship that can be obtained from the two points already calculated.

The method may also comprise, subsequent to establishing the dual connectivity session, determining, by the user device, whether the parameter of the signal received from the second node is below an exit threshold and, responsive to determining that the parameter of the signal received from the second node is below the exit threshold for the second node, disconnecting the user device from the secondary node. The exit threshold can be determined in dependence on the calculated preferred entry threshold, for example the exit threshold may be set at a predetermine value below the entry threshold. By establishing a relationship of this kind between the entry and exit thresholds, repeated connection/disconnection cycles can be controlled. Optionally, the exit threshold can be determined in dependence on an expected number of user devices in the area of the wireless network during a current time period. The use of an exit threshold for determining when a user device should be disconnected from a second node may assist both with optimising the average throughput per user device and to minimise the amount of control data carried by the network. Disconnections from and reconnections to the secondary nodes will result in the transmission of control data across the network, and as such by large numbers of disconnections from and reconnections will influence the effective ability to improve the average throughput of useful data.

In some embodiments, the parameter of the signal received from the second node may be the reference signal received power, reference signal received quality or received signal strength indicator. Other signal parameters may be adopted as appropriate.

The area of the wireless network may comprise a single node operating according to the second Radio Access Technology or may comprise multiple nodes operating according to the second Radio Access Technology.

The second Radio Access Technology may be 5G and the first Radio Access Technology may be 4G. The indication of the entry threshold may be received at the user device from the first node in a Radio Resource Control reconfiguration message. The indication of the entry threshold is received and used to configure an entry threshold for a B1 event. For example, a B1 event as defined in the 5G standard established by 3GPP. Thus the present disclosure may provide an event-based load balancing technique for use by operators of multi-radio dual connectivity 5G non-standalone including selecting an appropriate configuration of the event B1 define in the standard.

A further aspect of the disclosure also provides a user device for connecting to a wireless network, an area of a wireless network comprising first nodes operating according to a first Radio Access Technology and at least one second node operating according to a second Radio Access Technology, wherein the user device is configured to: establish a connection between the user device and a first node; receive, from the first node, an indication of an entry threshold for establishing a connection between the user device and a second node during a current time period, wherein the entry threshold is determined in dependence on an expected usage requirement for the area of the wireless network during the current time period; determine whether a parameter of a signal received from the second node exceeds the entry threshold; and responsive to determining that the parameter of the signal received from the second node exceeds the entry threshold, request the first node to establish a dual connectivity session between the user device and both the first and the second nodes. According to a still further aspect, the disclosure may provide a system comprising both the user device and the wireless network. Example or optional features of the first aspect may also apply to the further aspects of the disclosure.

A usage requirement fort the area of the wireless network can be a network requirement for the area of the wireless network and/or a user quality of service metric requirement for the area of the wireless network during the current time period. Network requirements may reflect, for instance, properties associated with overall network usage, while user quality of service metrics may reflect a desired behaviour of the network for users. For example, a total expected bit rate for all user devices, which may be calculated by multiplying the expected number of devices during the time period within a geographical area associated with the first and second nodes by an estimated average requested bit rate per device, comprises both a network requirement, as well as a user quality of service metric requirement for the area of the wireless network. In another example, an expected number of user devices within the geographical area during the time period comprises a network requirement for the area of the wireless network.

A still further aspect of the disclosure may provide a computer program product comprising computer executable instructions for performance of the method of the first aspect.

BRIEF DESCRIPTION OF THE DRAWINGS

Example embodiment of the present disclosure will now be described with reference to the accompanying drawings, in which:

FIG. 8 shows Table I which is a table listing the average number of UEs per MeNB;

FIG. 9 shows Table II which is a table listing the TI for each MeNB; and

FIG. 10 shows Table III which is a table listing the average throughput and MR-DC connections per second with the optimized TI values.

DETAILED DESCRIPTION

The description below relates to systems and methods for load balancing in an area of a wireless network, particularly a multi-radio dual connectivity (MR-DC) wireless network. The methods described herein involve the use of an entry threshold that depends on an expected number of user devices in the area of the wireless network to establish a new connection.

Figure 1:
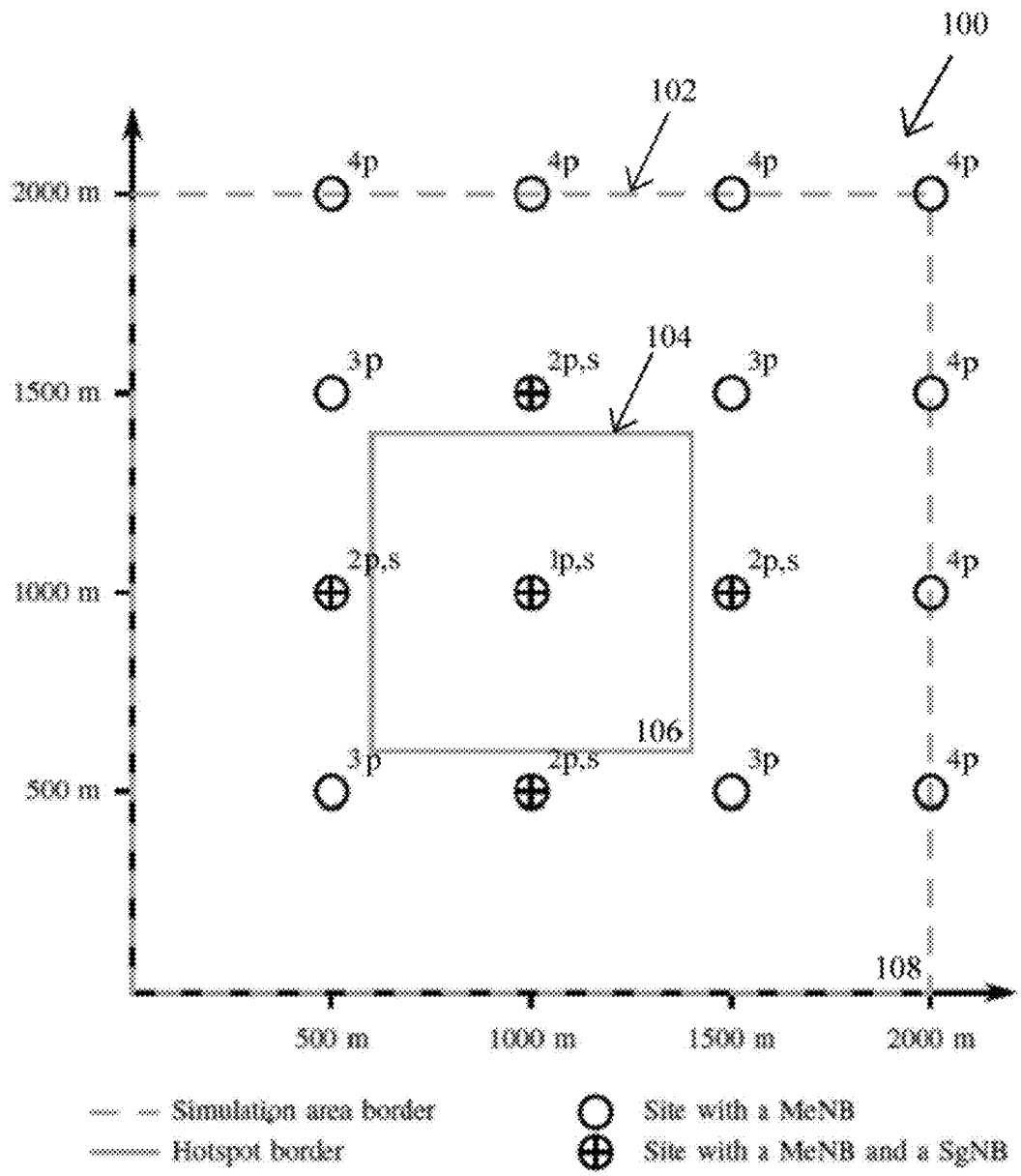
FIG. 1 shows a graphical representation of a simulation scenario with MeNBs located around in a grid-like disposition with a central hotspot comprising SgNBs co-located with some of the MeNBs.

Referring to FIG. 1, a grid-like disposition represents an area 100 of a MR-DC wireless network. The area 100 of FIG. 1 is delimited by the dashed line 102. The wireless network of FIG. 1, the first nodes 1p-4p or master evolve node Bs (MeNBs) are located at each corner of the grid at 500 m intervals. Some of the MeNBs (i.e., 1p-2p) are co-located with secondary next generation node Bs (SgNBs) 1a-2s. In FIG. 1, the locations comprising both an MeNB and a SgNB are represented by a crossed circle, whereas standalone MeNBs are represented by a regular circle. Optionally, the area of the MR-DC wireless network 100 can comprise a hotspot area 106 and a non-hotspot area 108. In FIG. 1, a hotspot area 106 is represented in the centre of the area of the MR-DC wireless network 100 as a square of 800 m side length delimited by line 104. The hotspot area 106 may describe a portion of the area of the MR-DC network 100 in which the density of user equipments (UEs) may be augmented with respect to a non-hotspot area 108. In particular, the UEs present within the hotspot area 106 are referred herein as hotspot UEs (HUEs) and the UEs located in the non-hotspot area 108 are referred to as non-hotspot UEs (NUEs).

Figure 2:
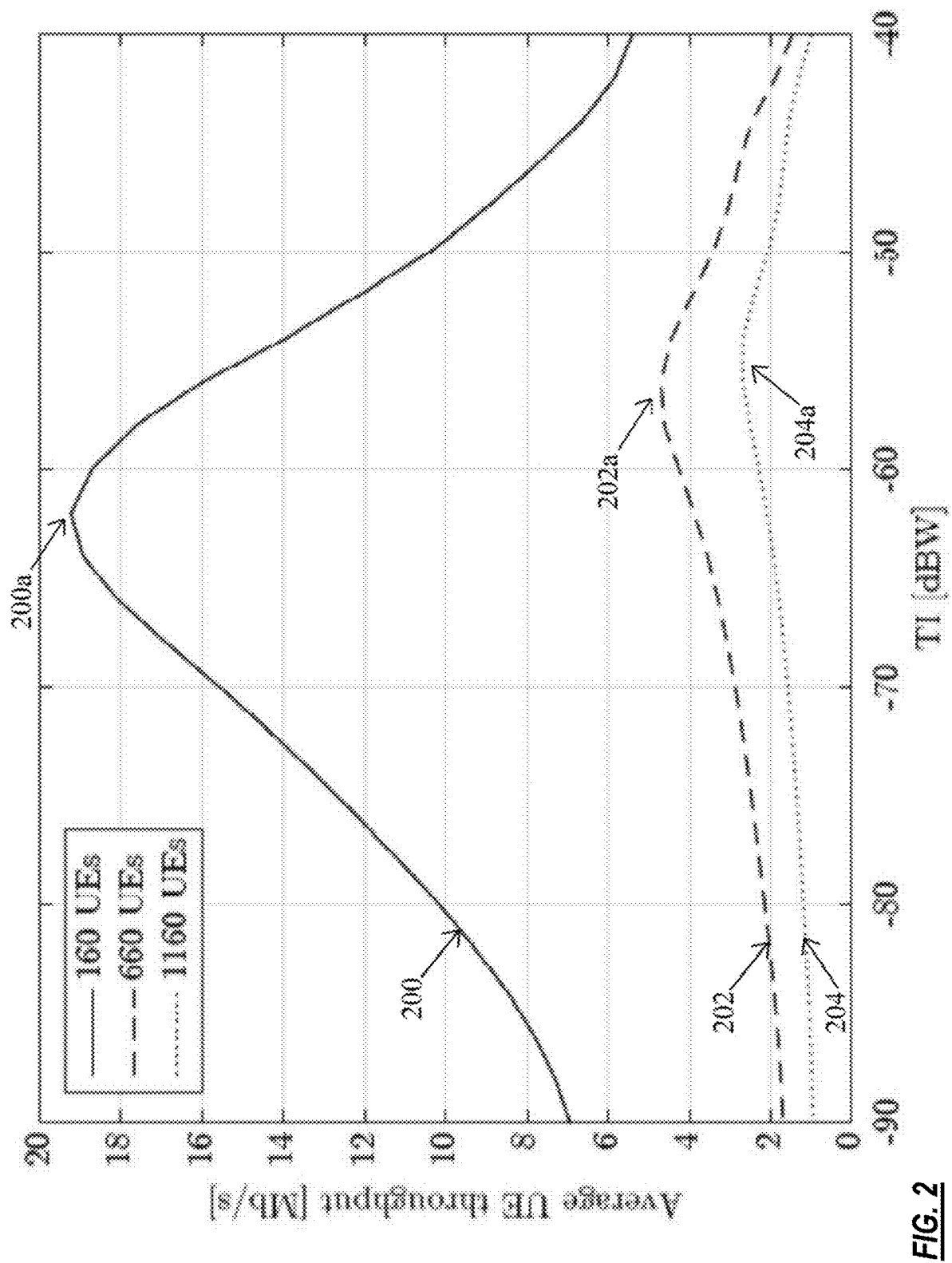
FIG. 2 shows the relationship between average throughput per user device and the entry threshold for 160, 660 and 1160 UEs.
Figure 3:
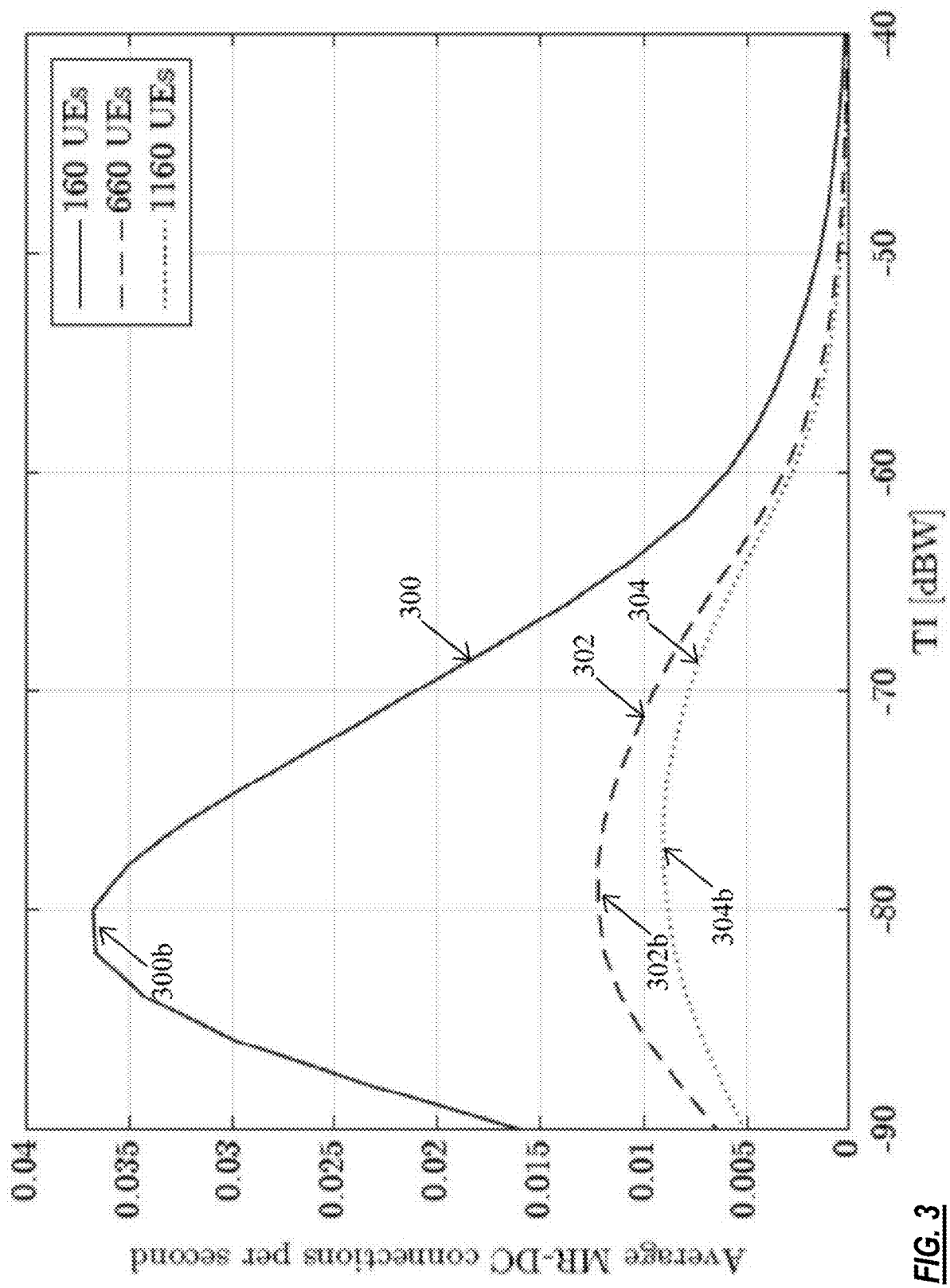
FIG. 3 shows the average MR.DC connections per UE per second for different entry threshold values for 160, 660 and 1160 UEs.
Figure 4:
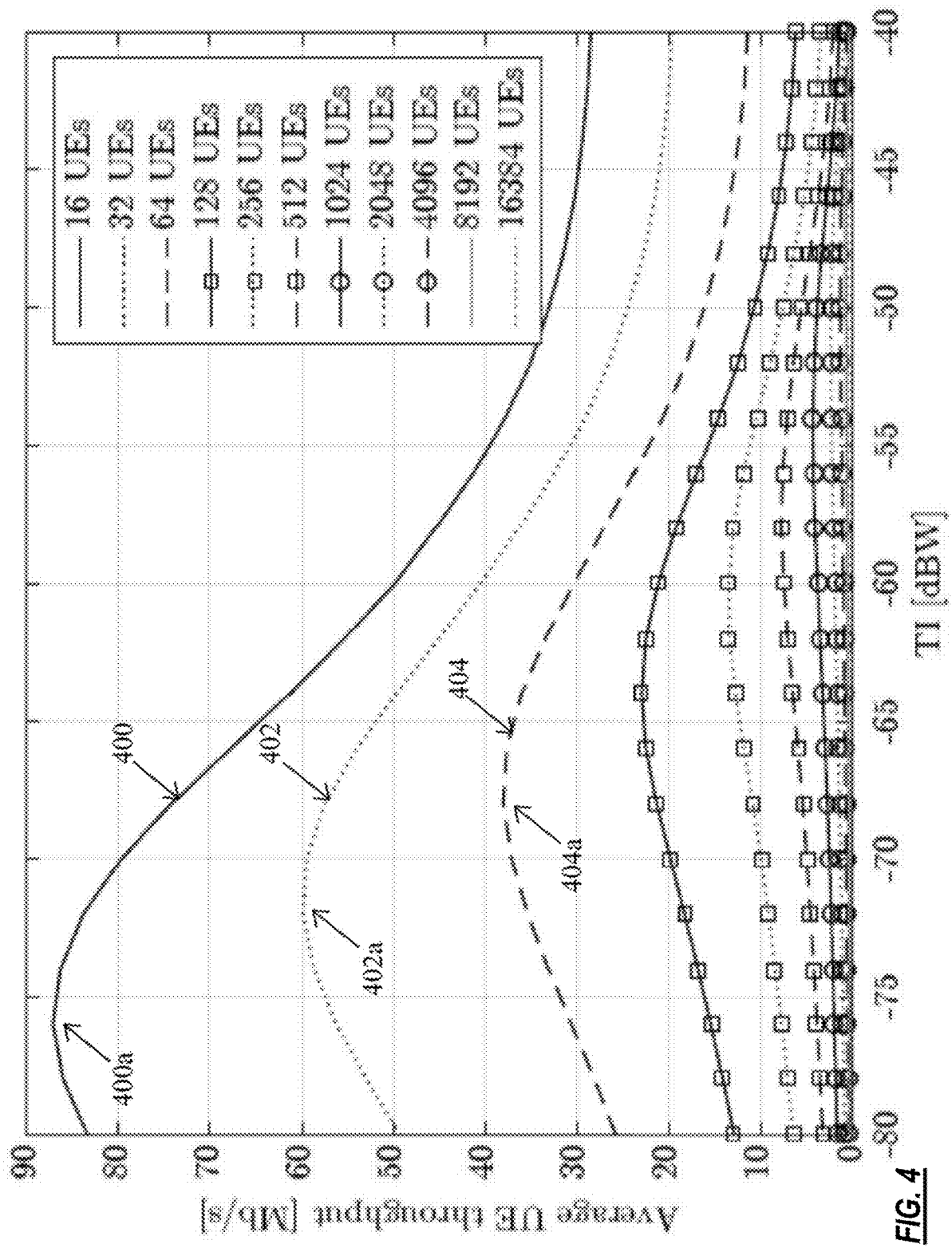
FIG. 4 shows the relationship between the average throughput per user device and the entry threshold.

An entry threshold may relate to a condition that must be met for a UE to connect to a node. The entry threshold may be a signal quality metric relating to the signal received from the node. For example, the entry threshold may be any of a minimum received signal power, received signal quality or received signal strength. A low entry threshold may allow more UEs to connect to a node, whereas a more restrictive threshold may result in fewer UEs being able to connect to a node. The presence of an entry threshold that optimises a simulated performance or average throughput per UE is shown in FIG. 2 to FIG. 4, as will be described in further detail below. The entry threshold may be communicated to the UEs from the MeNB through the Radio Resource Control (RRC) message to configure the entry threshold for the B1 event defined in the 5G standard.

In the simulation according to the MR-DC wireless network area of FIG. 1, MeNBs 1p to 4p are configured with a channel of 20 MHz bandwidth centred at 2 GHz while SgNBs is to 2 s are configured with a channel of 100 MHz bandwidth centred at 4.5 GHz with 100 MHz. The MeNBs (1p-4p) and SgNBs (1s-2s) have a corresponding transmit power of 40 dBW and an antenna height of 25 m. This simulation is configured to allow both HUEs and NUEs to move in a straight line in randomised directions within their designated area (i.e., HUEs are confined to the hotspot area 106 and NUEs are bound to the non-hotspot area 108). Propagation losses are modelled according to the following equation:

$$L = 32.4 + 20 \log_{10}(f_c) + 30 \log_{10}(d), \qquad \text{Eq. 1}$$

where $f_c$ is the central frequency in GHz, and d is the 3D distance between each UE and the nodes. Shadowing is modelled with a standard deviation of 7.8 dB and a correlation distance of 20 m. Note that the parameter values provided are merely examples of parameter values. In some embodiments, different parameters from those provided in this description may be used without departing from the scope of the present disclosure.

In an MR-DC capable network, UEs may always be connected to MeNBs. In the simulated scenario of FIG. 1, a handover procedure via which a UE may disconnect from one node and/or establish a connection or session with another node is assumed to be a perfect handover procedure. According to a perfect handover procedure, UEs may always be connected to the nodes with the greatest received signal power, received signal quality or received signal strength. In this manner, UEs are always connected to the "best" MeNB. Additionally, the UEs may also establish a dual connectivity session with the "best" SgNB if in MR-DC mode. For the purposes of the simulations described below, it is assumed that UEs have only one serving node, which is either a MeNB (in single connectivity mode) or a SgNB (in MR-DC). In the simulations described below, it is further assumed that the stations divide their bandwidth equally among their UEs. However, it is understood that base stations dividing their bandwidth equally among their UEs is not essential and that alternative implementations may operate with a different distribution of bandwidth amongst the UEs.

According to the present disclosure, by means of a Radio Resource Control (RRC) reconfiguration message, a MeNB 1p-4p may configure an entry threshold and a list of at least one SgNB 1s-2s to track. The MeNB may then send an indication to the UEs with which the MeNB may have previously established a connection of the entry threshold. Optionally, the MeNB may also send an indication of the at least one SgNB 1s-2s to track. The entry threshold is used by the UEs to report the presence of SgNBs 1s-2s that meet the entry threshold. For example, the entry threshold may be a signal quality metric relating to signals received at the UE from the SgNBs 1s-2s. In particular embodiments, the entry threshold may be a particular reference signal received power (RSRP), reference signal received quality (RSRQ) or received signal strength indicator (RSSI). The UEs may thus report when the received signal from a SgNBs meets (i.e. exceeds) this threshold. If the threshold is met, the UEs that utilise MR-DC to additionally connect to a SgNB are assumed to establish a connection with the SgNB with the best signal quality metric adopted (i.e. best RSRP, RSRQ or RSSI). When the signal quality metric is above the configured entry threshold, also referred to as threshold in (TI), and if the UE is not yet connected to a different SgNB, the MeNB starts a procedure to establish a dual connectivity session between the UE and both the MeNB and the SgNB. Optionally, if the UE is already connected to a different SgNB, the MeNB may disconnect the UE from this SgNB and establish a dual connectivity session between the UE and both the MeNB and the newly detected SgNB.

To simulate a relationship between average throughput per UE and the entry threshold, a UE that is connected to both a SgNB and a MeNB may be assumed to consume the resources of the SgNB only, or in other words, when in MR-DC mode, the SgNB is responsible for serving the UE's requests. In contrast, the UE's requests are served by the MeNB when the UE is not connected to a SgNB. Therefore, the UEs may only have one serving node, which is either a MeNB (in single connectivity mode) or a SgNB (in MR-DC mode). Alternatively, the relationship between average throughput per UE and the entry threshold may be simulated assuming that UEs may consume resources of a SgNB and a MeNB.

Optionally, MeNBs may also configure a threshold out (TO). The TO may be calculated in dependence on an expected number of user devices in the area of the MR-DC wireless network. The threshold out (or "exit threshold") may be defined in relation to the same signal quality metric as the threshold in. After establishing a dual connectivity session with a MeNB and a SgNB, the UE may detect that the signal quality metric received from the SgNB is below the TO. Responsive to determining this, the MeNB may disconnect the UE from the SgNB by releasing the MR-DC connection. The following figures make reference to an entry threshold (TI) that is configured for the RSRP. However, it is understood that using the RSRQ, RSSI or another signal quality metric may provide the analogous advantages.

The use of an entry threshold that is indicated by a MeNB to each of the UEs connected to the MeNB can allow operators to balance the load between MeNBs and SgNBs. In particular, as the number of 5G clients increases and the number of SgNBs start to saturate, an entry threshold can be dynamically adjusted to control the number of UEs consuming the resources of SgNBs. In this manner, the throughput per user can be optimised. The method described can be readily implemented by operators without requiring a modification of the current network structure or protocols.

FIG. 2 shows the simulated average throughput per UE 200-204 for a range of TI values and different number of UEs in the area of the MR-DC wireless network. For each number of UEs, there is an entry threshold represented by the peaks 200a-204a that optimises (i.e. maximises) the simulated average throughput per UE for the UEs in the area of the MR-DC wireless network. In the case of FIG. 2, the results are shown for three different scenarios, each comprising 160 NUEs and either 0 (for 200), 500 (for 202) or 1000 (for 204) HUEs. In each scenario, the TI (entry threshold) was varied between 90 and 40 dBW. For each set of parameters, the results were obtained by averaging 100 seeds. FIG. 2 shows that the entry threshold that optimises the simulated average throughput per UE increases with the number of UEs in the area of the MR-DC wireless network.

In all simulations shown the TO (exit threshold) was taken to be 10 dB below the TI. This value was selected to avoid a large amount of reconnections to the MeNB caused by the shadowing noisy pattern of the model, which has a standard deviation of 7.8 dB.

For entry threshold values below the entry threshold that optimises the simulated average throughput per UE for each number of UEs as represented in FIG. 2, the SgNBs may be the limiting nodes in the system. Entry threshold values below the entry threshold value that optimises the simulated average throughput per UE may allow a greater number of UEs to establish a dual connectivity session between UEs and both a MeNB and a SgNB, even when the UEs are far away from the SgNBs with which they have established a connection. As a result of a greater number of UEs connected to the SgNB, the available bandwidth per UE device is reduced. This can result in significantly low spectral efficiencies, particularly in the case of distant UEs. Both the limited bandwidth and increased distance between the SgNBs and the UEs whose requests they serve can have a detrimental effect on the average throughput per UE.

For entry threshold values above the entry threshold that optimises the average throughput per UE, the MeNBs may be the limiting nodes as it may result in a greater number of UEs being connected to the MeNBs only, which may imply that a large number of UEs' requests must be served by the MeNBs even though capacity exists on the SgNBs, thus reducing the available bandwidth per UE. Moreover, values well above the optimal threshold may imply that only the UEs within close proximity of a SgNB may establish a dual connectivity session.

Another relevant factor in efficient performance is the relative proportion of control data transmitted in comparison to the underlying data requested by the UEs. In particular, the volume of MR-DC connection configurations will reflect the number of times UES are connecting to and disconnecting from MR-DC. More frequent events of this kind indicate a proportional increase in the interchanged control data. FIG. 3 shows the relationship between the average connections to MR-DC per UE per second 300-304 for the same range of entry thresholds as FIG. 2. A large number of connections indicates that UEs are establishing dual connectivity sessions and subsequently disconnecting more frequently. The number of new MR-DC connections 300-304 is directly proportional to the amount of interchanged control data necessary to establish a dual connectivity session and to release the MR-DC connections and establish a connection between the UE and the MeNB only. FIG. 3 shows that the average number of connections to MR-DC per UE per second 300-304 strongly depends on the configured entry threshold value. The average number of MR-DC connections per second peak 300b-304b at values below the corresponding entry threshold values indicated by points 200a-204a that optimise the simulated average throughput per UE 200-204 for the same number of UEs. Notably, an excessively low entry threshold will not only be suboptimal in terms of the average throughput but will also unnecessarily increase the relative proportion of control traffic.

FIGS. 2 and 3 thus demonstrate the significance of the number of UEs to the optimum TI to balance load between MeNBs and SgNBs. In particular, the optimum value of TI increases as the number of UEs increases. Further support for this can be found in FIGS. 4 and 5. In particular, the simulations adopted to generate the data of FIG. 4 differ from the above in that only NUEs are included. Thus, the simulation implies a uniform density of UEs (i.e., with no distinction between NUEs and HUEs, or a defined hotspot area 106 that bounds a portion of the UEs as in FIG. 1). FIG. 4 shows the simulated average throughput per UE 400-404 for a simulation comprising a uniform density of UEs in this way, particularly in this example the scenario included $2^N$ NUEs per MeNB, where N ranged from 0 to 10. In the same way as in FIG. 2, FIG. 4 shows that for each number of UEs, there is an entry threshold represented by points 400a-404a that optimises the simulated average throughput per UE 400-404 for the total number of UEs in the area of the MC-DC wireless network. FIG. 4 shows that the entry threshold values 400a-404a that optimise the simulated average throughputs per UE 400-404 increase with the number of UEs. That is, a higher entry threshold will be required for a greater number of UEs in an area of the MR-DC wireless network (i.e., for a higher UE density), while a lower entry threshold will optimise the simulated average throughput per UE for a smaller number of UEs in the area of the MR-DC wireless network (i.e., a lower UE density).

Figure 5:
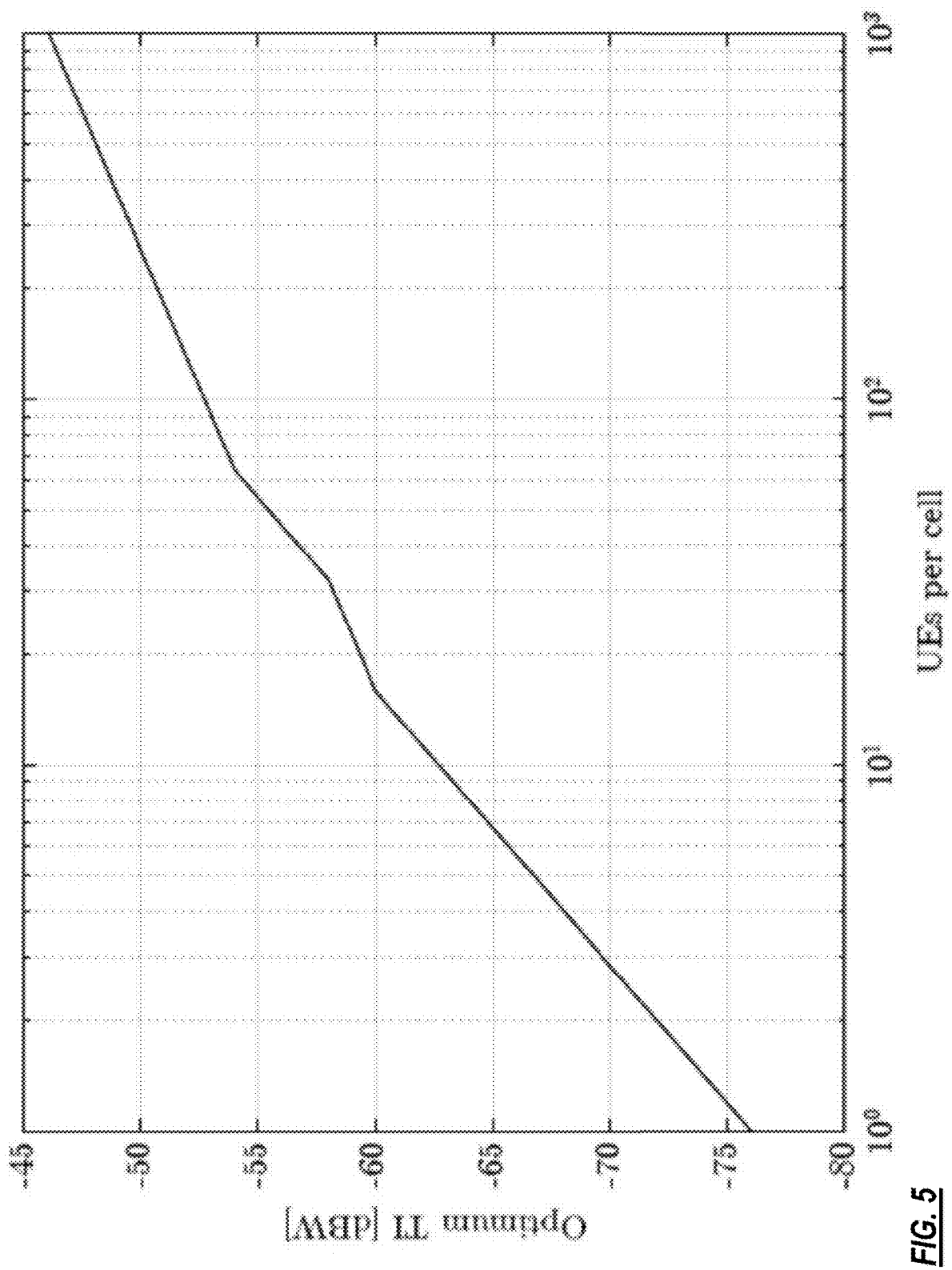
FIG. 5 shows the simulated optimum entry threshold values as a function of the number of UEs connected to the MeNB.

FIG. 5 depicts the entry threshold that optimises the simulated average throughput per UE as a function of the average number of UEs per MeNB based on the number of UEs and MeNBs within the area of the MR-DC wireless network. The present disclosure therefore provides for a process in which particular values of TI may be selected for each MeNB. In particular, such a process may comprise: 1) computing or estimating the average amount of UEs for each MeNB; and 2) selecting, based on a simulation such as that of FIG. 5, the entry threshold TI that provides optimum average throughput for that number of UEs.

The efficacy of this approach was tested in a hotspot as described above. In particular, 160 NUEs and either 0, 500, or 1000 HUEs were introduced. In order to complete step 1) above, it was assumed that all UEs in a 500 m by 500 m square around the MeNB are served by that MeNB. Consequently, the average amount of UEs in each MeNB can be calculated taking into account how this square interacts with the hotspot area. In particular, 4 different scenarios were identified. These are labelled "1", "2", "3" and "4" in Tables I and II, which illustrate the average amount of UEs and the corresponding optimal TI values calculated in accordance with the process described above respectively.

Adopting these TI values for each of the scenarios "1", "2", "3" and "4" identified in Tables I and II and simulating the behaviour of the system, the results in Table III were obtained. Notably, in all cases, the average throughput with TI values optimized in this way surpassed or equalled those illustrated in the example described with reference to FIG. 2 above, demonstrating the benefit of a cell-specific approach to setting the TI values (i.e. setting an optimal value TI for each MeNB). It is also noted that the total number of MR-DC connections was low, implying that this improved performance does not incur overheads associated with a significant amount of control data.

Notably, the analysis of FIG. 5 also shows that the relationship between the optimal entry threshold and the number of UEs is approximately a linear relationship when both the axis for entry threshold and UE number are logarithmic.

This insight facilitates a further aspect of this disclosure in which data obtained in particular circumstances are used to infer the optimum entry threshold in more general cases. Data may be obtained using a Radio Access Network (RAN) monitoring system. Such a system may organise data collected from the network in a set of bins representing areas of the network. The objective is to optimize the throughput in a mature 5G NSA network by configuring the B1 event on a cell basis, particularly by selecting the optimum entry threshold for the B1 event. In this way, different entry (and, optionally, exit) thresholds may be adopted for each cell, in dependence on the number of UEs and/or average requested throughput. These values may be adapted to optimise both the usage of the 5G nodes and the data throughput experienced by the UEs. Particularly, an approach has been developed to optimise overall average throughput per user.

Figure 6:
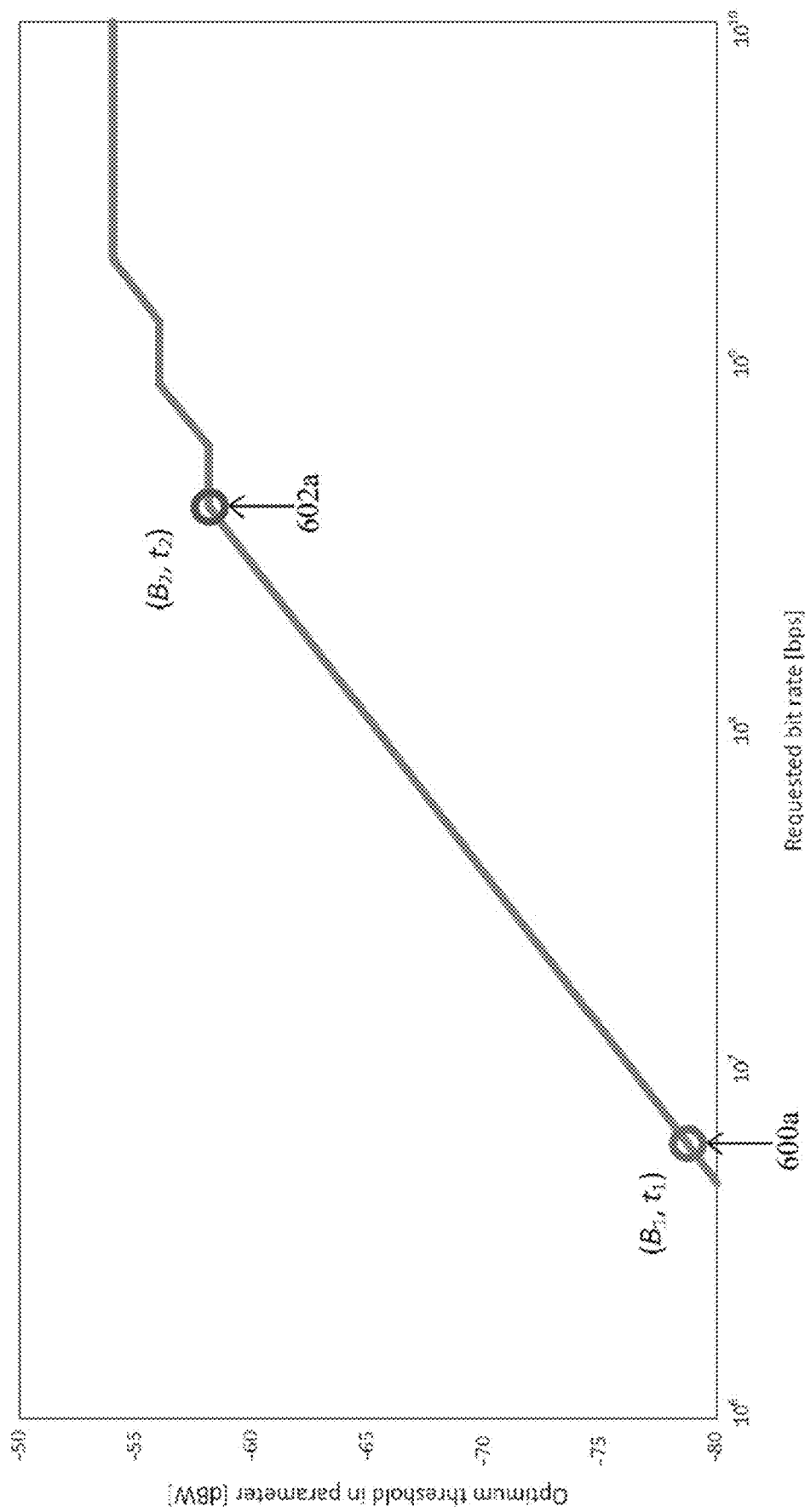
FIG. 6 shows a point that represents a preferred entry threshold for a low load time period and another point that represents a preferred entry threshold for a high load time period.

In particular, FIG. 6 illustrates an expected relationship between the requested bit rate B for a set of UEs which may access an SgNB node and the optimum entry threshold, plotted using logarithmic axes. The requested bit rate in this context is directly proportional to the number of UEs being considered. FIG. 6 illustrates points 600a and 602a, and an aspect of the present disclosure comprises calculating these points and interpreting the line connecting them from those points. In particular, a preferred entry threshold 600a is calculated based on data obtained for a low load time period and a different preferred entry threshold 600b is calculated based on data obtained for a high load time period. This method may further include interpolating a preferred entry threshold for the current time period based on interpolating between the points 600a and 602a based on an understanding of the requested bit rate B at that moment.

A low load time period can be any length time period during which a 100% of the UEs' requests is being served by the network. In other words, during a low load time period, the network is able to serve an average UE with the throughput that the UE requires. A high load time period can be any length time period during which less than a 100% of the UEs' requests are being served by the network 100. That is, during a high load time period, the network is not serving an average UE with the throughput requested by at least one of the UEs. In practice, a low load time period will usually be a time period during which relatively few UEs are present, while a high load time period will usually be a time period during which a relatively high number of UEs are present.

Once points 600a and 602a are calculated, it is possible to infer the equation of the line connecting them, and therefore to interpret an optimum entry threshold for any later time period.

Figure 7:
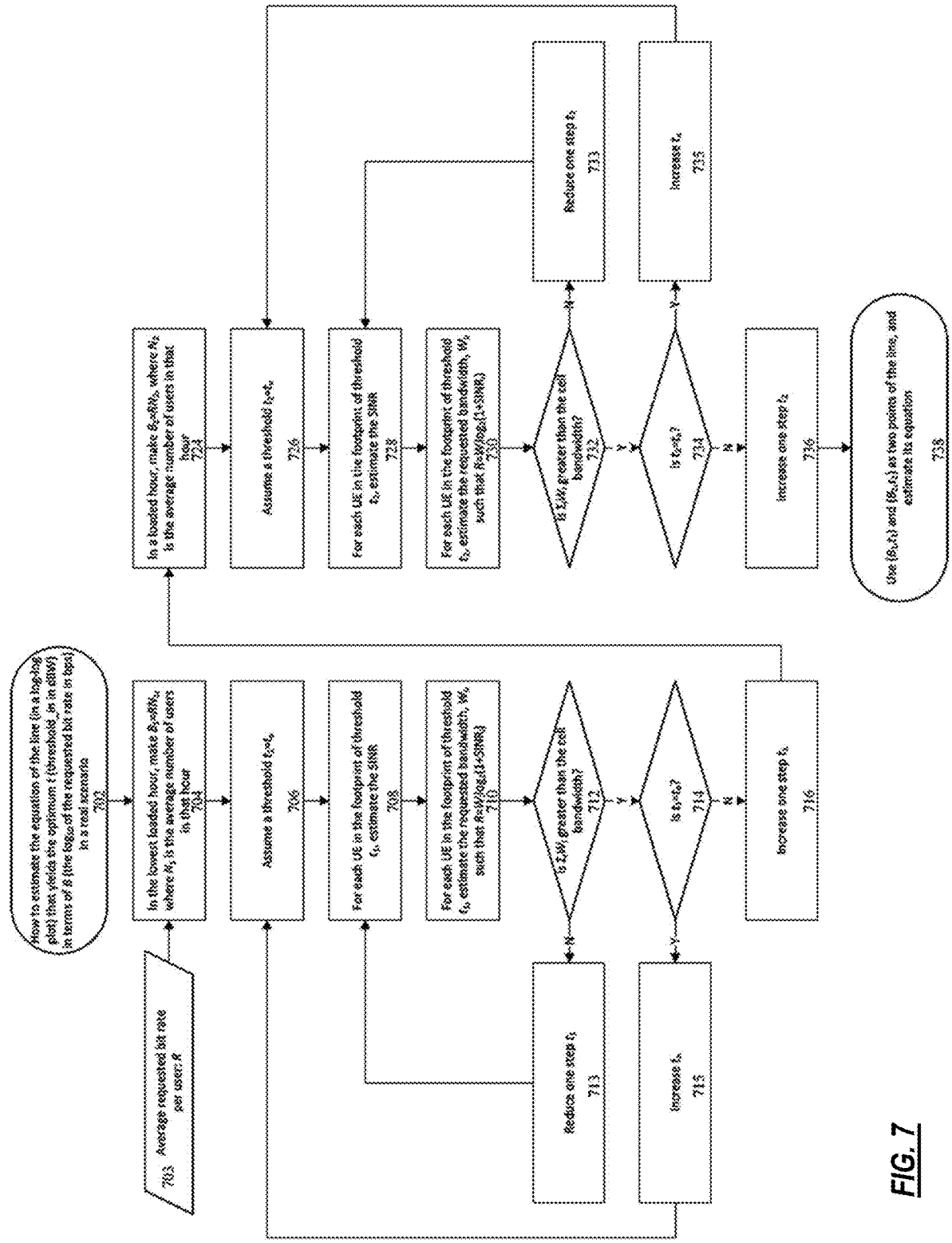
FIG. 7 shows a workflow for calculating a preferred entry threshold in dependence on a requested bitrate.

Referring now to FIG. 7, depicted is an example process 700 to determine the first point 600a representing the entry threshold $t_1$ that optimises the average throughput per UE at the low load time period and a second point 602a representing a second entry threshold $t_2$ that optimises the average throughput per UE at the high load time period.

As noted above, the method for calculating point 600a and point 602a for each node in the area of the MR-DC wireless network requires obtaining first network data representative of network traffic in the area of the MR-DC wireless network during a low load time period and second network data representative of network traffic in the area of the MR-DC wireless network during a high load time period. The first network data may correspond to one or more time windows of the low load time period.

In general, the low load time period may comprise one or more time windows (which may be from different days) where it is considered that there are enough users to provide a data set that is representative of traffic (i.e. generally not night hours) and it is also considered likely that the network is serving 100% of the requested bitrate. For example, the first network data may be representative of network traffic in the area of the MR-DC wireless network between 7 am and 10 am (i.e. this may be the low load time period). Where there are a plurality of non-consecutive time windows they need not be identical or same day. For example, the first network data may be representative of the network traffic Monday to Thursday between 1 pm and 3 pm and between 6 pm to 8 pm of a previous week.

The high load time period represents one or more time windows (again, not necessarily from the same day) where it is expected that not all of the requested bitrate is being 100% served because the network has reached its capacity. The second network data corresponds to the one or more time windows of the high load time period. For example, the second network data may be representative of the network traffic in the area of the MR-DC wireless network between 11 am and 1 pm. The plurality of non-consecutive time windows need not be the same for each day. For example, the second network data may be representative of the network traffic Monday to Thursday between 11 am and 1 pm and weekends between 4 pm and 6 pm.

A number of metrics may be pre-defined for use in the process of FIG. 7. That is to say, these metrics are used in the process of deriving an estimated relationship between a total requested bit rate B for a number of UEs within the footprint of a node and the optimum entry threshold for connection to that node in an MR-DC environment. In particular, these may include:

| | |
|---|---|
| Terminated_connections_5G | This is calculated for the final location of the connections and represents the number of connections terminated to the 5G network. It thus indicates the total number of connections made during the time period. |
| Terminated_connections_4G | This is calculated for the final location of the connections and represents the number of connections terminated to the 4G network. It thus indicates the total number of connections made during the time period. |
| Total_Volume_DL_5G | This is calculated for the final location of the connections and represents the total volume of data downloaded by each connection on the 5G network. |
| Total_Volume_DL_4G | This is calculated for the final location of the connections and represents the total volume of data downloaded by each connection on the 4G network. |
| Avg_SINR_5G | This is a measurement of average Signal-to-Noise ratio and is calculated for both the first and last location of each connection. |

The first network data and second network data may be processed before performing the process 700 of FIG. 7. The first and second network data may be processed by filtering out the UEs that do not have Evolved Universal Terrestrial Radio Access (E-UTRA) New Radio (NR) Dual Connectivity (DC) capabilities (EN-DC capabilities) and only considering UEs for which this requirement is true. Only UEs with EN-DC capabilities may be considered since the UEs need to be equally capable of connecting to both MeNBs and SgNBs. The process is carried out across a given optimization area defined as a group of network elements of a geographical area. Preferably, this area is one where users' traffic profile is similar in order that an estimate of the average requested throughput per user remains consistent. For example, it is preferable to separate urban and rural areas or areas where demographic differences are known to be associated with differences in usage habits.

For the whole optimization area, the low load time period and high load time period are established. In order to establish the low load time period, for example, a trend of the number of Terminated_Connections_4G may be calculated and the process may continue by detecting daytime valleys, that is hours between 7 am and 10 pm (daytime) in which traffic is low. Hour slots may then be selected for use as the low load time period. As noted above, these hours represent times when it is expected that users' requested bit rates are being 100% served.

A similar process may be used to establish the high load time period. Again, data (such as Terminated_Connections_4G) during daytime (e.g. 7 am to 10 pm) may be analysed, but this time for peaks in usage in order to select hour slots for use as the high load time period. It may be expected that at these times less than 1000% of the requested throughput is being served due to network constraints.

The process 700 may be used to estimate the relationship between the optimum entry threshold for a particular node in the area of the MR-DC wireless network and current or expected network traffic conditions. In particular, it has been shown above that this relationship is of the form log x=a log y+b, where x is the optimum threshold, y is a measure of network traffic conditions, and both a and b can be derived from the empirically observed data at low load and high load times. Network traffic conditions may include, for example, the number of UEs in the area of the MR-DC wireless network. In the example shown in FIG. 7, the network traffic conditions are the requested bit rate, which is a function of the number of UEs in the area. At step 702 the method for determining the relationship (which is linear in the log-log plot) between the requested bit rate B and the optimum entry threshold is initiated. Subsequently, optimum values of the entry threshold t are calculated for both low load conditions (steps 703 to 716) and high load conditions (step 724 to 736), and from these the relationship between the optimum threshold at other network conditions can be interpolated. In FIG. 7, the low load time period is represented as a "lowest loaded hour" when relatively few UEs are connected to the network, while the high load time period is associated with a "loaded hour" with a relatively high number of UEs connected to the network. In the description below, the "first network data" is data observed for the network during the low load conditions and the "second network data" is data observed for the network during the high load conditions.

At step 703, a calculation is performed to generate a value for R, the average requested throughput or bit rate per UE. The average requested bit rate per UE R, can be determined using Eq. 2 below. The total volume of downloads over the area of the MR-DC wireless network ($\Sigma_b$) corresponding to downloading operations served by MeNBs (Total_Volume_DL_4G) and SgNBs (Total_Volume_DL_5G) is determined over the one or more time windows of the first network data. This is calculated based on the first network data (i.e. that obtained during the low load time period) since this reflects the time at which it is assumed that the requested bit rate for each UE is successfully served. The average value R is calculated by summing across data bins b and hours h of the low load time period the total data volume downloaded and dividing this by the number of connections as follows:

$$R = \frac{\Sigma_b \Sigma_h (\text{Total\_Volume\_DL\_4G} + \text{Total\_Volume\_DL\_5G})}{\Sigma_b \Sigma_h (\text{Terminated\_Connections\_4G} + \text{Terminated\_Connections\_5G})} \quad \text{Eq. 2}$$

In general, the area of the MR-DC network for which the process 700 is performed may be divided into bins. At step 704, for the first network data (i.e. the network data associated with a low load environment), a total requested bit rate $B_1$ for each bin is calculated. $B_1$ for a particular bin is determined by the relationship $B_1=RN_1$, where R represents the average requested bit rate per UE determined at step 703 using Eq. 2 and $N_1$ represents the average number of UEs in the particular bin that are connected to a node over the one or more time windows that comprise the first network data. After determining $B_1$, the process 700 advances to step 706. At step 706, the optimum entry threshold $t_1$ for the low load time period is set to the same value as an initial entry threshold to. At the outset of the process, the initial entry threshold $t_0$ is set to an arbitrary value. For example, the initial value of $t_0$ may be set to a predetermined value. Subsequently an iterative process is used to vary this value until the optimum threshold is established.

After step 706, the process 700 advances to step 708. Step 708 is performed for each bin. The process estimates the Signal to Noise Ratio ($SINR_i$) for each UE in a particular bin for which the threshold $t_1$ applies. For this, step 708 may comprise calculating the footprint for each node in the area of the MR-DC wireless network for $t_0$. In particular, in order to define a footprint the process may comprise filtering for calls ended under the $t_0$ footprint of their End_cell and marking the bins of data with at least 10% of their area under the $t_0$ footprint for a given cell. That cell is then considered the footprint owner for the marked bins. In such a process, a given bin may be within the footprint of a number of cells. A bin can have one or more footprint owners. After the Signal to Noise Ratio ($SINR_i$) for each UE within the footprint of the threshold $t_1$ is determined, the process advances to step 710.

Step 710 of 700 requires estimating the requested bandwidth $W_i$ associated with each UE in a bin within the footprint of a node. Optionally, step 710 may only estimate the requested bandwidth $W_i$ for each UE in the footprint of a marked bin. The bandwidth $W_i$ for each UE can be calculated using the relation of Eq. 3. Subsequent to estimating $W_i$ for each UE, the method can progress to step 712.

$$R = W_i \log_2(1 + SINR_i) \quad \text{Eq. 3}$$

$$W = \frac{R}{\log_2(1 + SINR_{avg})} \times \Sigma_h \quad \text{Eq. 4}$$

(Terminated_Connections_4G + Terminated_Connections_5G)

Step 712 requires determining the total requested bandwidth W for a given bin over the plurality of UEs for which $W_i$ was calculated, during one or more windows of the first network data. The total requested bandwidth W for the bin may be calculated by summing the requested bandwidth $W_i$ for each UE over the one or more time windows of the first network data ($\Sigma_h$). For instance, the total requested bandwidth W may be calculated using Eq. 4, where the sum is the sum over the one or more time windows of the first network data. In the described process, the total requested bandwidth W is calculated for the set of marked bins. These totals are then themselves summed to determine the total requested bandwidth $W_{CELL}$ for the node as a whole (i.e. $\Sigma_i W_i$). This is then compared to the total effective available bandwidth of the cell/node to determine whether the node is thus saturated and/or capable of serving all requests. For this determination, the bandwidth of the "best" SgNB of each bin may be used. For example, the SgNB with the greatest average SINR of each bin may be used. The bandwidth can be a bandwidth limit for the SgNB. The bandwidth limit of the SgNB can be a SgNB bandwidth defined for the SgNB in the topology. In some cases, the bandwidth limit may be defined as the maximum theoretical bandwidth. In other cases, the bandwidth limit may be set out as a fraction of the theoretical maximum bandwidth. For example, the bandwidth limit may be defined as 90% or 95% of the theoretical maximum bandwidth, since overload for a real-life scenario may happen at a level that is lower than the theoretical maximum bandwidth. Once the bandwidth for each "best" SgNB has been defined, step 712 determines whether the total requested bandwidth for each SgNB is greater than the bandwidth of each respective SgNB. The total requested bandwidth for a SgNB may be calculated by adding the total requested bandwidth of the bins in which the particular SgNB is the "best" SgNB. The bins for which the SgNB is the "best" SgNB may comprise one or more bins in which the SgNB has the greatest average SINR relative to the other SgNBs.

If the process 700 determines at step 712 that the total requested bandwidth for a SgNB is not greater than the SgNB's bandwidth, the SgNB is not considered to be overloaded. If the total requested bandwidth for the SgNB is greater than the SgNB's bandwidth, the SgNB is then considered to be overloaded. If the SgNB is not overloaded, then the process advances to step 713. At step 713, the value of $t_1$ reduced one step. That is, $t_1$ is set to a less restrictive threshold value and the steps 708-712 are repeated. If the SgNB is overloaded, the process 700 advances to step 714. If $t_1$ corresponds to a threshold value that is the same as that of $t_0$ (i.e. if it is the first iteration of the steps 706-712), then the process 700 advances to step 715. At step 715, the initial threshold to is increased by one step. That is, the initial threshold to is set to a more restrictive threshold value before a subsequent iteration of the steps 706-712. If, however, $t_1$ is different from $t_0$, the process advances to step 716. At step 716, $t_1$ is increased by one step. That is, if the SgNB is overloaded and it is not the first iteration of the steps 706-712, $t_1$ is set to the last value of $t_1$ for which the SgNB was not overloaded.

After step 716 is performed, the final value $t_1$ for the low load time period has been established and the process 700 advances to step 724 after which the optimum entry threshold for the high load time period is established. Step 724 consists of determining the total requested bit rate $B_2$ for each bin over the one or more time windows corresponding to the high load time period that comprise the second network data. $B_2$ for a particular bin is determined by making $B_2=RN_2$, where R represents the average requested bit rate per UE determined using Eq. 2 and $N_2$ represents the average number of users in the particular bin that are connected to a node over the one or more time windows that comprise the second network data. After determining $B_2$, the method advances to step 726. At step 726, the optimum entry threshold $t_2$ for the high load time period is set to the same value as the initial entry threshold to. Optionally, at this step the initial entry threshold $t_0$ may be set to a predetermined value different from the current value.

After step 726, the process 700 advances to step 728. At step 728, the process estimates a Signal to Noise Ratio ($SINR_i$) for each UE in a bin that is within the footprint of the threshold $t_2$. A set of bins associated with the footprint of a given cell/node may be established in the same manner as previously at step 708. After Signal to Noise Ratio ($SINR_i$) for each UE within the footprint of the threshold $t_2$ is determined, the process advances to step 730 which proceed analogously to step 710.

Step 730 comprises estimating the requested bandwidth $W_i$ for each UE in the footprint of the marked bins. The bandwidth $W_i$ for each UE can be calculated using the relation of Eq. 3. Subsequent to estimating $W_i$ for each UE, the method can progress to step 732.

Step 732 continues in line with step 712 to assess whether the total requested bandwidth for a given cell/node exceeds the available bandwidth.

If the process 700 determines at step 732 that the total requested bandwidth for a SgNB is not greater than the SgNB's bandwidth, the SgNB is not considered to be overloaded. If the total requested bandwidth for the SgNB is greater than the SgNB's bandwidth, the SgNB is then considered to be overloaded. If the SgNB is not overloaded, then the process advances to step 733. At step 733, the value of $t_2$ is reduced one step. That is, $t_2$ is set to a less restrictive threshold value and the steps 728-732 are repeated. If the SgNB is overloaded, the process 700 advances to step 734. If $t_2$ corresponds to a threshold value that is the same as that of $t_0$ (i.e. if it is the first iteration of the steps 726-732), then the process 700 advances to step 735. At step 735, the initial threshold to is increased by one step. That is, the initial threshold to is set to a more restrictive threshold value before a subsequent iteration of the steps 726-732. If, however, $t_2$ is different from $t_0$, the process advances to step 736. At step 736, $t_2$ is increased by one step. That is, if the SgNB is overloaded and it is not the first iteration of the steps 726-732, $t_2$ is set to the last value of $t_2$ for which the SgNB was not overloaded. This is the value of $t_2$ that represents an optimum value which utilises the SgNB node to its full extent without overloading it.

Subsequently, the process advances to step 738. At step 738, the total requested bit rate $B_1$ and corresponding threshold $t_1$ for a low load time period and the total requested bit rate $B_2$ and corresponding threshold $t_2$ for a high load time period are used as two points of a line that represents an estimated relationship between the load of the wireless network and the entry thresholds that optimise the average throughput per UE. Step 738 further comprises estimating the equation of the line defined by the two points $(B_1, t_1)$ and $(B_2, t_2)$.

A further aspect of this disclosure involves using the equation of the line estimated following the process 700 to determine a threshold for establishing a connection between a UE and a second node for a number of user devices in the area of the wireless network. The number of user devices may be a current number of user devices in the area of the MR-DC wireless network. Alternatively, the number of UEs may be an expected number of user devices in the area of the MR-DC wireless network. Determining the threshold from the graph requires first calculating the requested throughput for the MeNB using Eq. 5 below, wherein the sum of "Terminated connections_4G" and "Terminated_Connections_5G" is performed over all the bins for which the MeNB has the greater average SINR. For example, the appropriate bins may be assessed using the metric End_SINR_4G; in alternative examples the bins for which the MeNB is considered the best server may be assessed using End_RSRP_4G or End_RSRQ_4G if preferred. After determining the requested throughput, the threshold for the number of UEs may be determined based on the requested throughput and the equation of the line.

$$B_x = R\Sigma_b(\text{Terminated\_Connections\_4}G + \text{Terminated\_Connections\_5}G) \quad \text{Eq. 5}$$

The process 700 can be used to select a particular entry threshold that maximises the number of satisfied UEs and encourages the use of SgNBs (i.e., favour a MR-DC mode) whenever possible. A UE is considered to be satisfied when its requests are efficiently served, regardless of whether a MeNB (single connectivity mode) or a SgNB (in MR-DC mode) served the request. Once the appropriate entry threshold has been identified, it can be communicated to the UE through a Radio Resource Control (RRC) message to configure the entry threshold for the B1 event of the 5G standard, or any other appropriate messaging protocol. This will have the effect of controlling the circumstances under which connections using the MR-DC mode will be effected.

Variations and modifications of the disclosure provided above may be adopted by the skilled person. For example, the data set adopted to perform the algorithm described with reference to FIG. 7 above may be varied according to circumstances and/or preferences. In the example above, a dataset D1 may be limited to geolocated calls where the parameters Total_Volume_DL_5G and Total_Volume_DL_4G do not have a NULL value. However, in alternative approaches a dataset D2 may be limited to gelocated calls but not exclude cases where the parameters Total_Volume_DL_5G and Total_Volume_DL_4G have a NULL value. A dataset such as D2 is in fact adopted in the process described above since no filter has been applied to the Total_Volume parameters; this may have the effect of diluting the total volume across more calls.

In other circumstances, datasets not limited to geolocated calls may be adopted. For example, a dataset D3 may not be limited to geolocated calls but may retain the restriction that the parameters Total_Volume_DL_5G and Total_Volume_DL_4G do not have a NULL value. In this circumstance, an estimate of the known volume being ignored by the algorithm above may be derived, and compensation for this may be adopted. Indeed, a further dataset D4 may not be limited to geolocated calls and may also omit the restriction that the parameters Total_Volume_DL_5G and Total_Volume_DL_4G do not have a NULL value. From such a dataset, an estimate of the unknown volume being ignored may be derived, and again suitable compensation/penalisation of the proposed algorithm may be adopted.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for balancing load in an area of a wireless network comprising first nodes operating according to a first Radio Access Technology and at least one second node operating according to a second Radio Access Technology, the method comprising:
    establishing a connection between a user device and a first node;
    subsequent to setting an entry threshold based on an expected usage requirement for the area of the wireless network during a current time period, receiving, at the user device from the first node, an indication of the entry threshold for establishing a connection between the user device and a second node during the current time period;
    determining, by the user device, whether a parameter of a signal received from the second node exceeds the entry threshold; wherein the parameter and the entry threshold are one of received signal power, received signal quality, or received signal strength;
    responsive to determining that the parameter of the signal received from the second node exceeds the entry threshold, establishing, by the first node, a dual connectivity session between the user device and both the first and the second nodes; and
    responsive to determining that the parameter of the signal received from the second node is below an exit threshold for the second node, disconnecting, by the first node, the user device from the second node, wherein the entry threshold and the exit threshold are utilized to load balance between the first node and the second node, wherein the exit threshold is set dependent on and below the entry threshold, to control repeated connection/disconnection cycles.

2. A method according to claim 1, wherein the expected usage requirement is an expected total requested bit rate.

3. A method according to claim 1, wherein the expected usage requirement comprises an expected number of user devices in the area of the wireless network during the current time period.

4. A method according to claim 1, wherein the entry threshold is determined by:
    simulating a relationship between average throughput per user device and the entry threshold,
    selecting the entry threshold in order to optimise the average throughput per user device.

5. A method according to claim 1, wherein the entry threshold is determined by:
    calculating a preferred entry threshold for a low load time period;
    calculating a preferred entry threshold for a high load time period; and
    interpolating between the preferred entry thresholds for the low load and high load time periods in order to calculate the entry threshold for the current time period.

6. A method according to claim 1,
    wherein the exit threshold is a predetermined value of about 10db below the entry threshold, such that the exit threshold and the entry threshold are each one of received signal power, received signal quality, or received signal strength.

7. A method according to claim 1, wherein the area of the wireless network comprises a single node operating according to the second Radio Access Technology.

8. A method according to claim 1, wherein the first Radio Access Technology is 4G and the second Radio Access Technology is 5G.

9. A method according to claim 1, wherein the indication of the entry threshold is received at the user device from the first node in a Radio Resource Control reconfiguration message.

10. A method according to claim 9, wherein the indication of the entry threshold is received and used to configure the entry threshold for a B1 event.

11. A user device for connecting to a wireless network, an area of a wireless network comprising first nodes operating according to a first Radio Access Technology and at least one second node operating according to a second Radio Access Technology, wherein the user device is configured to:
    establish a connection between the user device and a first node;
    subsequent to setting an entry threshold based on an expected usage requirement for the area of the wireless network during a current time period, receive, from the first node, an indication of an entry threshold for establishing a connection between the user device and a second node during a current time period,
    determine whether a parameter of a signal received from the second node exceeds the entry threshold; and wherein the parameter and the entry threshold are one of received signal power, received signal quality, or received signal strength;
    responsive to determining that the parameter of the signal received from the second node exceeds the entry threshold, request the first node to establish a dual connectivity session between the user device and both the first and the second nodes; and
    responsive to determining that the parameter of the signal received from the second node is below an exit threshold for the second node, disconnecting, by the first node, the user device from the second node, wherein the entry threshold and the exit threshold are utilized to load balance between the first node and the second node, wherein the exit threshold is set dependent on and below the entry threshold, to control repeated connection/disconnection cycles.

12. A user device according to claim 11, wherein the expected usage requirement is an expected total requested bit rate.

13. A user device according to claim 11, wherein the expected usage requirement comprises an expected number of user devices in the area of the wireless network during the current time period.

14. A user device according to claim 11, wherein the entry threshold is determined by:
   simulating a relationship between average throughput per user device and the entry threshold,
   selecting the entry threshold in order to optimise the average throughput per user device.

15. A user device according to claim 11, wherein the entry threshold is determined by:
   calculating a preferred entry threshold for a low load time period;
   calculating a preferred entry threshold for a high load time period; and
   interpolating between the preferred entry thresholds for the low load and high load time periods in order to calculate the entry threshold for the current time period.

16. A user device according to claim 11, wherein the
   exit threshold is a predetermined value of about 10 dB below the entry threshold, such that the exit threshold and the entry threshold are each one of received signal power, received signal quality, or received signal strength.

17. A user device according to claim 11, wherein the area of the wireless network comprises a single node operating according to the second Radio Access Technology.

18. A user device according to claim 11, wherein the first Radio Access Technology is 4G and the second Radio Access Technology is 5G.

19. A user device according to claim 11, wherein the indication of the entry threshold is received at the user device from the first node in a Radio Resource Control reconfiguration message.

20. A user device according to claim 19, wherein the indication of the entry threshold is received and used to configure the entry threshold for a B1 event.

* * * * *